US011417097B2

(12) United States Patent
Lin et al.

(10) Patent No.: US 11,417,097 B2
(45) Date of Patent: Aug. 16, 2022

(54) VIDEO ANNOTATION SYSTEM FOR DEEP LEARNING BASED VIDEO ANALYTICS

(71) Applicant: HEWLETT PACKARD ENTERPRISE DEVELOPMENT LP, Houston, TX (US)

(72) Inventors: Qun Yang Lin, Beijing (CN); Jun Qing Xie, Beijing (CN); Shuai Wang, Beijing (CN); Kyu-Han Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/010,795

(22) Filed: Sep. 2, 2020

(65) Prior Publication Data
US 2022/0067381 A1 Mar. 3, 2022

(51) Int. Cl.
*G06V 20/40* (2022.01)
*G06K 9/62* (2022.01)
*G06V 10/94* (2022.01)

(52) U.S. Cl.
CPC .......... *G06V 20/41* (2022.01); *G06K 9/6253* (2013.01); *G06K 9/6256* (2013.01); *G06K 9/6263* (2013.01); *G06V 10/955* (2022.01); *G06V 20/48* (2022.01); *G06V 20/49* (2022.01)

(58) Field of Classification Search
CPC .......... G06K 9/00711–00771; G06K 9/00986; G06K 9/6253; G06K 9/6256; G06K 9/6263; G06V 20/41; G06V 20/48; G06V 20/49; G06V 10/955
See application file for complete search history.

(56) References Cited
U.S. PATENT DOCUMENTS

| 9,330,171 | B1* | 5/2016 | Shetty | G06K 9/00744 |
| 9,424,493 | B2 | 8/2016 | He et al. | |
| 2010/0049874 | A1* | 2/2010 | Chene | H04L 67/28 |
| | | | | 709/246 |
| 2018/0336683 | A1* | 11/2018 | Feng | G06N 3/08 |
| 2019/0026278 | A1* | 1/2019 | Abedin | G06F 16/434 |
| 2019/0156202 | A1 | 5/2019 | Falk et al. | |
| 2019/0354766 | A1* | 11/2019 | Moore | G06F 16/583 |

(Continued)

FOREIGN PATENT DOCUMENTS

WO WO-2019232641 A1 * 12/2019 ............... G06N 3/08

OTHER PUBLICATIONS

Fan et al., "Few-Shot Object Detection with Attention-RPN and Multi-Relation Detector", May 10, 2020, 16 pages.

(Continued)

*Primary Examiner* — Casey L Kretzer
(74) *Attorney, Agent, or Firm* — Sheppard Mullin Richter & Hampton LLP

(57) ABSTRACT

A video annotation system for deep learning based video analytics and corresponding methods of use and operation are described that significantly improve the efficiency of video data frame labeling and the user experience. The video annotation system described herein may be deployed at a network edge and may support various intelligent annotation functionality including annotation tracking, adaptive video segmentation, and execution of predictive annotation algorithms. In addition, the video annotation system described herein supports team collaboration functionality in connection with large-scale labeling tasks.

18 Claims, 10 Drawing Sheets

(56) References Cited

U.S. PATENT DOCUMENTS

2020/0394814 A1* 12/2020 Schulter ............... G06K 9/6267
2021/0125004 A1* 4/2021 Robert .................... G06N 3/04

OTHER PUBLICATIONS

He et al., "Mask R-CNN", ICCV, Jan. 24, 2018, pp. 1-12.
IBM® Knowledge Center, "Labeling objects", available online at <https://www.ibm.com/support/knowledgecenter/en/SSRU69_1.1.3/base/vision_label.html>, retrieved on Sep. 8, 2020, 8 pages.
Kang et al., "Few-Shot Object Detection via Feature Reweighting", IEEE/CVF International Conference on Computer Vision (ICCV) 2019, Oct. 21, 2019, 12 pages.
Lei et al., "A Novel Key-Frame Extraction Approach for Both Video Summary and Video Index", Hindawi Publishing Corporation, The Scientific World Journal, vol. 2014, Article ID 695168, 10 pages.
Peng et al., "Detecting Heads using Feature Refine Net and Cascaded Multi-scale Architecture", IEEE ICPR, Nov. 24, 2018, 6 pages.
Quintanilla et al., "Tutorial: Detect objects using ONNX in ML.NET", Microsoft, Jan. 30, 2020, 34 pages.
Sabina Pokhrel, "Annotate Your Image—Using Online Annotation Tool!", available online at <https://towardsdatascience.com/annotate-your-image-using-online-annotation-tool-52d0a742daff>, retrieved on Sep. 8, 2020, Towards Data Science, Mar. 26, 9 pages.
Sekachev et al., "Computer Vision Annotation Tool: A Universal Approach to Data Annotation", Intel, Mar. 1, 2019, 17 pages.
Shmelkov et al., "Incremental Learning of Object Detectors without Catastrophic Forgetting", ICCV, Aug. 23, 2017, pp. 1-10.
Zhang et al., "Single-Shot Refinement Neural Network for Object Detection", CVPR, Jan. 3, 2018, pp. 1-14.

* cited by examiner

VIDEO ANNOTATION SYSTEM FOR DEEP LEARNING BASED VIDEO ANALYTICS

DESCRIPTION OF RELATED ART

Computer vision is a field of engineering focused on developing systems and applications that enable a computer to make intelligent decisions based on captured images. Specifically, computer vision applications attempt to enable a computer to understand and automate tasks that are capable of being performed by a human visual system such as acquiring, processing, analyzing, and understanding digital images.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
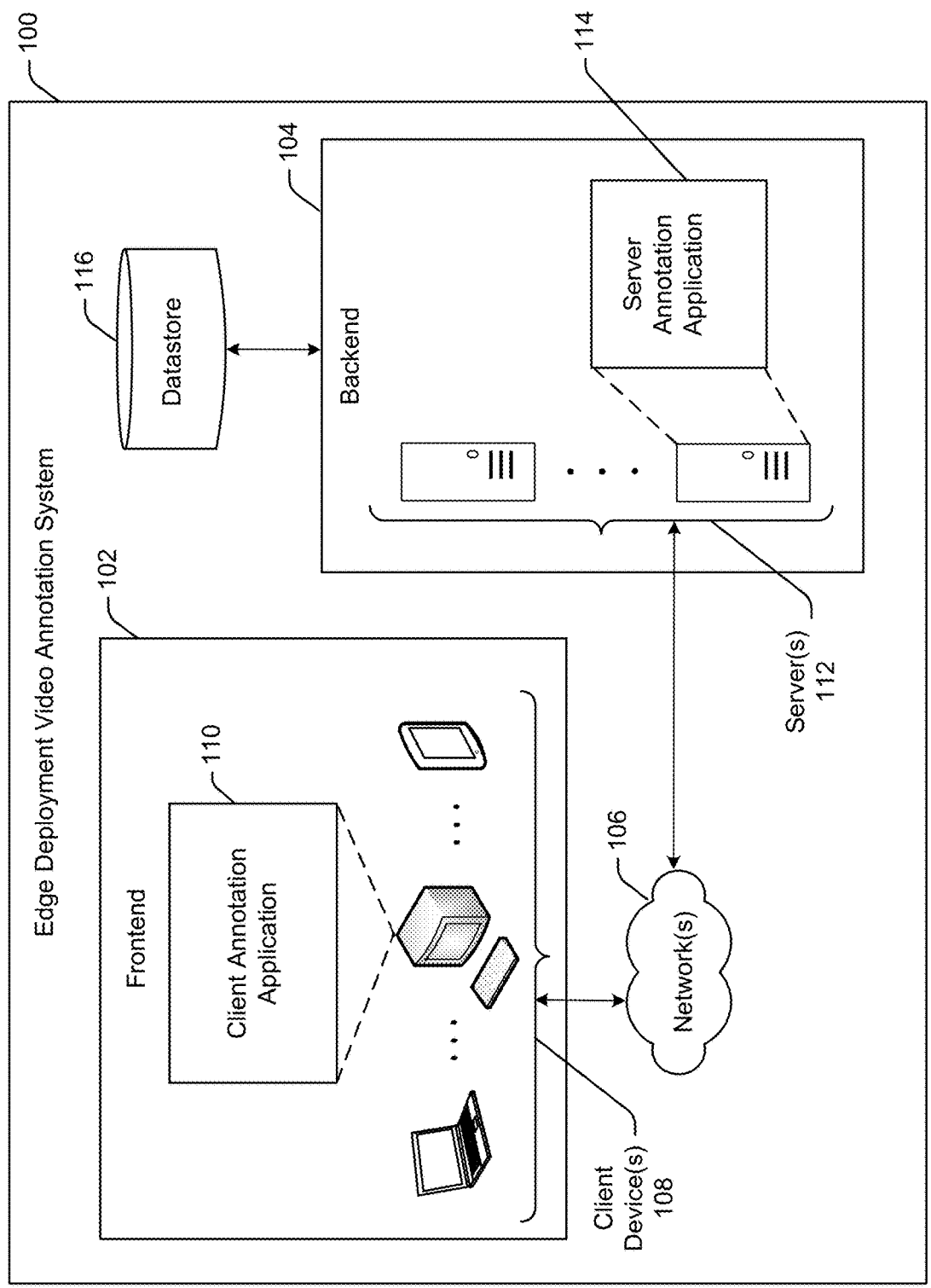
FIG. 1A depicts an edge deployment video annotation system according to an example embodiment of the invention.

The figures are not exhaustive and do not limit the present disclosure to the precise form disclosed.

DETAILED DESCRIPTION

Recently, video analytics has begun to leverage deep learning techniques. Such techniques are heavily dependent on large, high-quality ground-truth datasets, which are currently obtained through manual annotation/labeling. Relying on human labeling to create training datasets is often expensive and time-consuming. Currently, video annotation tools may support interpolating annotations for intermediate frames between manually-created annotations of a start frame and end frame, but only one label per frame is supported. Some conventional annotation tools support segmentation, but only on a per-interval time basis. Moreover, conventional labeling tools typically require users to upload datasets to be labeled to a cloud provider, resulting in security concerns.

Example embodiments of the technology disclosed herein relate to a video annotation system for deep learning based video analytics and corresponding methods of use and operation that significantly improve the efficiency of video data frame labeling and the user experience by providing various intelligent annotation functionality including annotation tracking, adaptive video segmentation, and predictive annotation algorithms. In addition, a video annotation system according to example embodiments of the invention supports team collaboration functionality in connection with large-scale labeling tasks.

In example embodiments, adaptive video segmentation can significantly reduce the time cost associated with manual labeling. In example embodiments, adaptive video segmentation includes performing pairwise comparisons of individual frames of video data to determine whether a frame difference between frames being compared is sufficiently small to allow for one of the frames to be excluded from annotation without impacting the quality of the annotated dataset for training purposes. Performing adaptive video segmentation with respect to all frames of raw video data files (or some subset thereof) can significantly reduce the number of frames that require annotation, thereby reducing the annotation burden dramatically, particularly as the amount of raw video data increases. Thus, adaptive video segmentation, as disclosed herein, represents a technical solution to the technical problem of poor performance (in terms of time cost) associated with conventional techniques for labeling video data for use as a ground-truth dataset for ML training purposes.

Further, in example embodiments, predictive annotation (e.g., labeling) of video data frames can also significantly reduce the burden of manual annotation. Predictive annotation/labeling (also referred to herein at times as pre-annotation or pre-labeling) may be performed on dataset images (e.g., a collection of sets of video data frames obtained from the adaptive segmentation technique described herein). Predictive labeling may include utilizing one or more ML algorithms/models to process each frame. An ML algorithm/model used for predictive labeling may be pre-trained to detect a set of categories of objects and to label detected objects on the frame image. Labeling a detected object may include, for example, constructing a polygon (e.g., a bounding box) around the object in the frame image. Predictive labeling of a detected object may further include storing various predictive annotation information for an detected object including, without limitation, position information, type information, attribute information, and the like. By performing predictive annotation on video data frames prior to providing the predictive annotated frame sets to a manual annotator, the efficiency of manual annotation is greatly improved. In particular, the burden of manual annotation is significantly reduced because a manual annotator need only correct any incorrect predictive labels, but need not modify predictive annotation information that is correct. The degree to which the burden of manual annotation is reduced depends on the efficacy of the ML models used to perform the predictive annotation. Thus, predictive annotation, as disclosed herein, represents a technical solution to the technical problem of poor performance (in terms of time cost) associated with conventional techniques for labeling video data for use as a ground-truth dataset for ML training purposes.

According to example embodiments of the invention, as part of supporting the collaboration functionality, the video annotation system may be configured to distribute sets of video data frames to various annotators. The annotators may be able to access the frame sets via a user interface and perform various annotation-related tasks on the video frame images. In some example embodiments, predictive annotation may have been performed on a frame set prior to distribution to an manual annotator. As a result of the predictive annotation, the frames in the frame set may include corresponding annotation information including labels assigned to detected objects in the frames. Such labels may identify positions, object classes, and the like for the detected objects. A manual annotator may be provided with the capability, via the user interface, to modify the predictive annotation information. For example, a user may be able to remove a label, add a new label, modify an object class of a label, or the like. Thus, collaboration functionality, as disclosed herein, represents a technical solution to the technical problem of generating a high-quality, large-scale ground-truth dataset for use with ML training.

In example embodiments, the user interface via which a manual annotator may access video data frames (e.g., predictive annotated frame sets) may also provide other annotation task-related functionality that improves the efficiency of annotation tasks performed by the manual annotator. For instance, in example embodiments, an annotation tracking function may be provided that permits a user to copy annotation information associated with a given frame to one or more subsequent frames without having to manually label the subsequent frames. For example, a user may utilize a copy function provided via the user interface to copy one or more labels and associated annotation information for a particular frame to a subsequent similar frame to which such information is relevant without having to manually label the subsequent frame. Annotation tracking can significantly reduce the time burden of manual annotation by allowing a user to quickly reproduce labels for subsequent frames. Thus, annotation tracking, as disclosed herein, represents a technical solution to the technical problem of poor performance (in terms of time cost) associated with conventional techniques for labeling video data for use as a ground-truth dataset for ML training purposes.

FIG. 1A illustrates an example video annotation system 100 in which example embodiments of the technology may be implemented. The example system 100 is provided for illustrative purposes only and should not be interpreted as limiting the applicability of the technology to only the depicted implementation. In example embodiments, the video annotation system 100 may be deployed at a network edge such as the edge of a communications network associated with a service provider, in which case, the system 100 may be referred to as an edge deployment video annotation system 100, as illustrated in FIG. 1A. In a cloud or distributed architecture, the edge is considered the point at which a service provider network connects to a third-party network. In example embodiments, the edge deployment video annotation system 100 includes client-owned and managed hardware components.

As illustrated in FIG. 1A, the edge deployment video annotation system 100 can include a frontend environment 102 and a backend environment 104. The frontend 102 may be communicatively coupled to the backend 104 over a network connection 106. In various embodiments, the network connection 106 can include any combination of wireless and/or wired network(s) including, but not limited to, a local area network (LAN); a wide area network (WAN); a cellular network; a public communications network such as the Internet; or any other suitable network. In some example embodiments, the backend 104 may reside on-premises with the frontend 102, but may nonetheless be communicatively coupled via the network(s) 106 such as via a on-premises LAN. In other example embodiments, the backend 104 may be located remotely from the frontend 102 such as at a remote data center.

The backend 104 can include one or more servers 112 or other computing devices configured to support one or more services provided by a service provider. One or more of the servers 112 may be designed based on a lightweight framework for developing ops-friendly, high performance, RESTful web services. In example embodiments, a backend server 112 may be deployed in a bare metal x86 server, a virtual machine, a container, or the like. A server 112 may provide users with a set of web services that provide video annotation-related functionality such as creating/updating/removing an annotation project; adding/updating/removing an annotator; and so forth. In various example embodiments, the aforementioned set of web services may be embodied as a server annotation application 114, whose annotation-related functionality is accessible to users through the frontend 102, or more specifically, through a client annotation application 110 that resides and executes at the frontend 102, and which is configured to communicate with the server annotation application 114 via the network connection 106. In particular, the server annotation application 114 may provide adaptive video segmentation services, predictive annotation services, and the like, which may be accessible via the client annotation application 110. The server annotation application 114 may reside on and execute on a single server 112 or across multiple servers 112.

In example embodiments, the backend 104 may be operatively coupled to a datastore 116. The datastore 116 may include various storage media, database(s), etc. The backend 104, or more specifically, the server(s) 112 may communicate with the datastore 116 using, for example, a Java Database Interface (JDBI), which is a Structured Query Language (SQL) convenience library for Java. Alternatively, the server(s) 112 may use any other suitable application programming interfaces (APIs)/protocols to access, store, and retrieve data from the datastore 116. In example embodiments, the datastore 116 may be implemented via a MySQL database. In example embodiments, the datastore 116 may store video data; annotated video data; annotation information (e.g., labels applied to video data frames); annotation project information; annotator information; etc.

The frontend 102 of the edge deployment video annotation system 100 may include one or more client device(s) 108. The client device(s) 108 (which may be referred to hereinafter in singular form for ease of explanation) may include any suitable user terminal capable of displaying or otherwise presenting a user interface via which a user can access the client annotation application 110, and ultimately the server annotation application 114. The client device 108 may include a desktop computer; a laptop computer; a tablet computer/device; a smartphone; a personal digital assistant (PDA); a wearable computing device; a gaming console; or the like. For ease of illustration, only a single frontend 102 is depicted in FIG. 1A. It should be appreciated, however, that in various embodiments the edge deployment video annotation system 100 may include a plurality of frontends 102. For example, in some embodiments, one or more frontend 102 client deployments may be managed by a single client. Further, in some example embodiments, a plurality of different clients may each have their own managed client frontend deployments within the system 100.

In example embodiments, the client annotation application 110 may be accessible via a client device 108. For instance, the client annotation application 110 may be an Internet application or the like that runs within a web browser loaded on a client device 108. The frontend client annotation application 110 may be implemented using any suitable programming language/environment including, without limitation, Hypertext Markup Language (HTML); Cascading Style Sheets (CSS); D3 (an open-source JavaScript library for visualizing data with HTML, Scalable Vector Graphics (SVG), and CSS); AngularJS (an open-source web framework for rich Internet applications running in web browsers); and so forth. The client annotation application 110 may include a set of web-based UIs via which a user may access a set of annotated-related functionality including, without limitation, dataset management; annotator management; annotation project management; collaboration management; and so forth. In example embodiments, the client annotation application 110 may access various web services, APIs, or the like running at the backend 104 (e.g., RESTful web services).

As previously noted, in some example embodiments, the video annotation system 100 may reside and operate at the edge of a communications network of a service provider, which may correspond to the point at which a service provider network connects to a third-party network. With most current cloud-based annotation systems, the client is required to submit the video files and other information to cloud servers within the service provider's network (i.e., data must be sent from the edge to the core of the service provider's network). This requirement introduces data security concerns by limiting the ability of the client to maintain control over the data after it has been sent to a third-party (here, the service provider), and in particular, by allowing the data to be stored and processed on equipment not within the direct ownership or control of the client. Such an arrangement reduces the flexibility the client has in performing annotations and utilizing the annotated frames to assist in video analytics such as to train one or more ML algorithms to perform various analytical tasks on video data. Moreover, in this traditional cloud-based approach, the information is all processed at the core data center of the service provider, introducing latency and reducing the ability of the client to manage and track annotations and task progression.

Figure 1B:
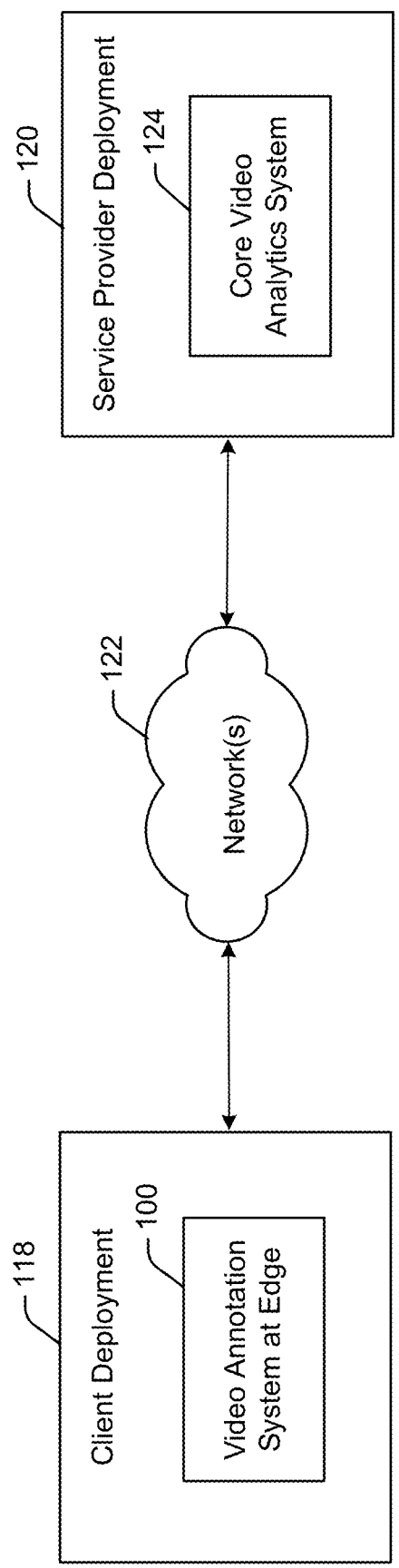
FIG. 1B depicts a networked architecture including a client deployment and a service provider deployment according to an example embodiment of the invention.

Various embodiments of the technology disclosed herein provide a technical solution to the above-described technical problem of diminished data security that traditional cloud-based approaches for video annotation suffer from. In particular, a video annotation system according to example embodiments of the invention (e.g., the video annotation system 100) is deployed at an edge of a communication network of a service provider that provides video annotation functionality. Referring now to FIG. 1B, the video annotation system 100 deployed at the network's edge, including both the frontend environment 102 and the backend environment 104, may form part of a same client deployment 118 at the network edge. The client deployment 118 may be communicatively coupled to a service provider deployment 120 via one or more networks 122, including any of those types of networks described previously in reference to the network(s) 106. The service provider deployment 120 may include a core video analytics system 124. In example embodiments, the core video analytics system 124 may support various video analytics functions such as training an ML model based on a high-quality annotated video dataset, employing the trained ML model to perform various video analytics such as object detection, semantic segmentation, instance segmentation, or the like.

Referring again to FIG. 1A, as will be discussed in greater detail later in this disclosure, the backend server(s) 112 may be configured to provide various backend annotation services for users at the frontend 102 including, for example, adaptive video segmentation and predictive annotation. These services may first require that video data be uploaded from the frontend 102 to the backend 104. Because, however, both the frontend 102 and the backend 104 may reside at the network edge as part of the same client deployment 118 (as illustrated in FIG. 1B), uploading video data from a client device 108 at the frontend 102 to one or more of the server(s) 112 at the backend 104 does not raise data security concerns because both the frontend 102 and the backend 104 are managed/controlled by the same client entity. Thus, according to example embodiments of the invention, video annotation services/functionality are available to a user of a client device 108 at the frontend 102 via the server annotation application 114 executing at the backend 104 without having to upload video data to a cloud environment (e.g., to the service provider deployment 120), and thus, a technical solution in the form of enhanced data security is achieved over conventional cloud-based annotation approaches.

Figure 2:
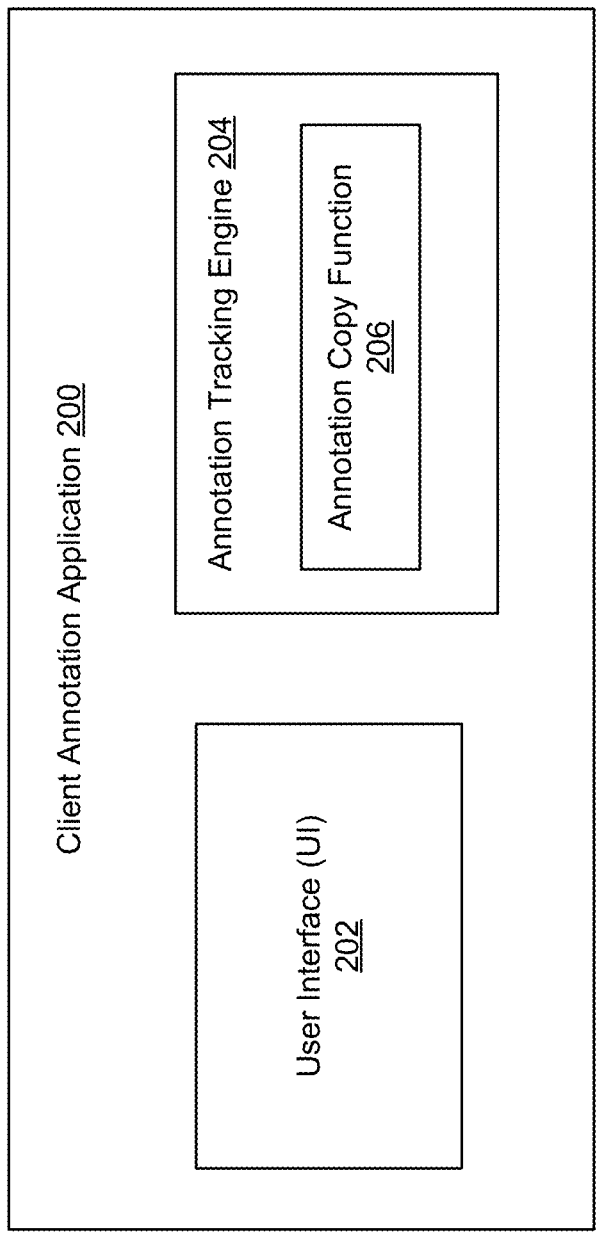
FIG. 2 depicts example components of a client annotation application according to an example embodiment of the invention.

Referring now to FIG. 2, an example implementation 200 of the client annotation application 110 is illustrated. In an example embodiment, the client annotation application 200 includes a user interface (UI) 202 and an annotation tracking engine 204. The UI 202 may include one or more graphical user interfaces (GUIs) or the like of the client annotation application 200 (e.g., web-based interfaces) that are accessible on a client device 108 using, for example, a web browser, mobile browser, or the like. The GUIs of the client annotation application 200 may include various interactive elements (e.g., buttons, links, menus, etc.) that enable user interaction with video data and/or annotated video data and that enable access to functionality of the server annotation application 114 such as adaptive video segmentation, predictive annotation, and the like.

In example embodiments, the client annotation application 200 may include one or more UI elements via which functionality of the annotation tracking engine 204 can be leveraged. In particular, the annotation tracking engine 204 may include an annotation copy function 206 that may be accessible via one or more selectable UI elements of the UI 202. The annotation copy function 206 may be accessible by selecting a "copy" button or widget presented on the UI 202. Selection of the annotation copy function 206 may result in all labeled regions of a video data frame (e.g., a frame currently being viewed in the UI 202) being copied to a selected frame (e.g., a neighboring frame). For instance, neighboring video data frames may be very similar to one another, in which case, annotation information (e.g., labels, attribute information, etc.) relevant to one frame is likely to be relevant to a neighboring frame. As such, rather than having to manually annotate the neighboring frame, a user may select the annotation copy function 206 to automatically transfer the labels and other annotation information of a current frame to a neighboring frame. Thus, the annotation copy function 206 can significantly reduce the time and cost burden of manual annotation.

Figure 3:
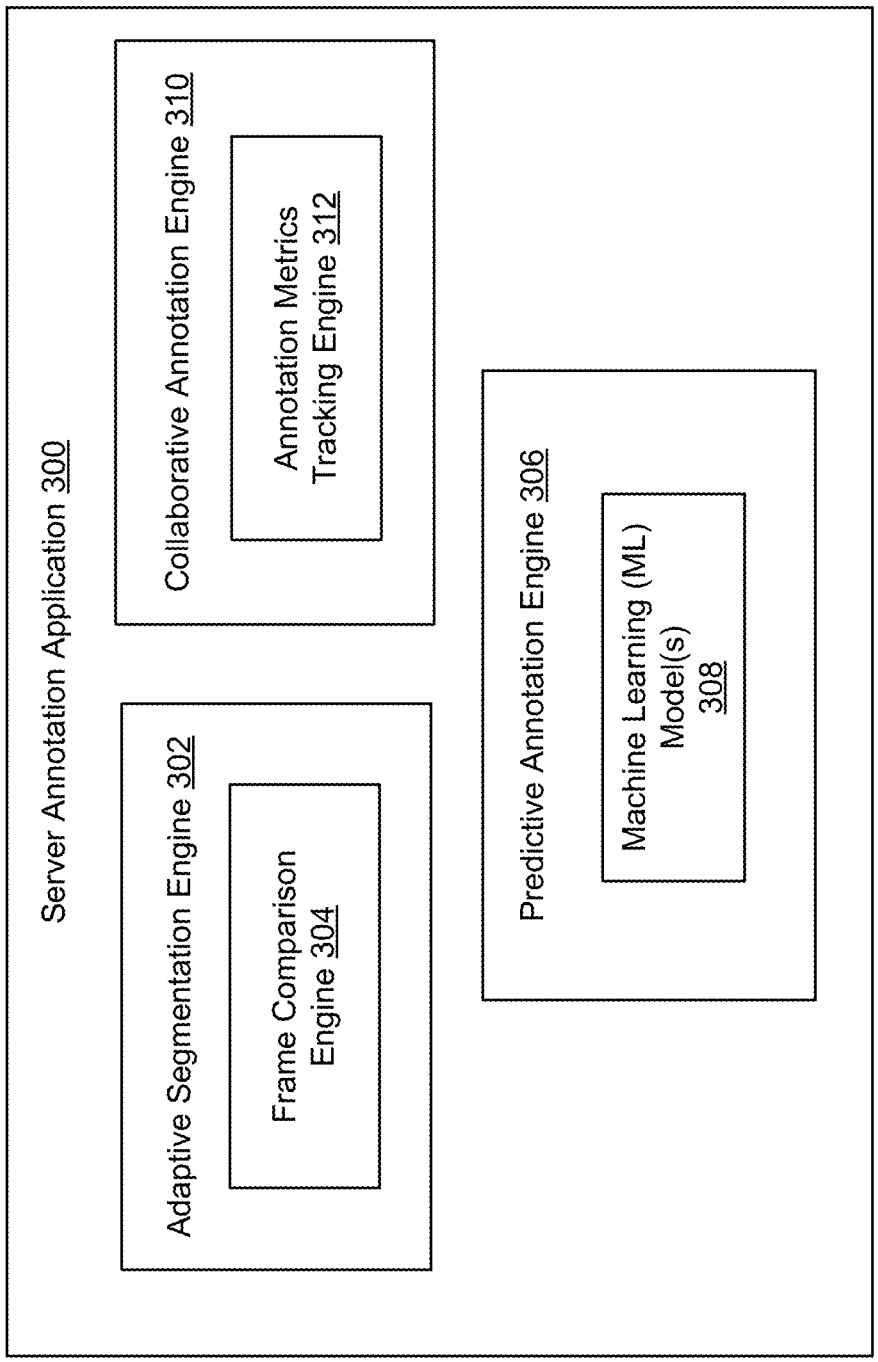
FIG. 3 depicts example components of a server annotation application according to an example embodiment of the invention.

FIG. 3 depicts an example implementation 300 of the server annotation application 114 according to an example embodiment of the invention. The example server annotation application 300 is depicted as including various engines. These engines can be implemented in any combination of hardware, software, and/or firmware. In certain example embodiments, one or more of these engines can be implemented, at least in part, as software and/or firmware modules that include computer-executable/machine-executable instructions that when executed by a processing circuit cause one or more operations to be performed. It should be appreciated that any description herein of an engine performing a function inherently encompasses the function being performed responsive to computer-executable/machine-executable instructions of the engine being executed by a processing circuit. In example embodiments, these engines may be customized computer-executable logic implemented within a customized computing machine such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing unit/core can cause input data contained in or referenced by the computer-executable program code to be accessed and processed by the processing unit/core to yield output data.

In an example embodiment, the server annotation application 300 includes an adaptive segmentation engine 302, a predictive annotation engine 306, and a collaborative annotation engine 310. The adaptive segmentation engine 302 may include machine-readable/machine-executable instructions stored in a storage media such as a memory that, when executed by one or more processing units, cause adaptive segmentation operations to be performed to segment video data (e.g., raw video data files) into sets of video data frames (or simply sets of frames or frame sets). As will be described in more detail later in this disclosure, the adaptive segmentation engine 302 may be configured to execute an adaptive segmentation algorithm that is able to reduce the number of video data frames to be annotated by performing a pairwise comparison of neighboring frames, determining their level of similarity, and determining whether to include or exclude the a frame based on its determined level of similarity to a neighboring frame. The adaptive segmentation engine 302 may include a frame comparison engine 304 that includes machine-readable/machine-executable instructions stored in a storage media such as a memory that, when executed by one or more processing units, cause operations to be performed as part of execution of the adaptive segmentation algorithm such as, for example, the frame comparison of neighboring frames to determine their similarity.

The predictive annotation engine 306 may include machine-readable/machine-executable instructions stored in a storage media such as a memory that, when executed by one or more processing units, cause predictive annotation operations to be performed. In some example embodiments, the predictive annotation engine 306 may receive, as input, one or more frame sets (e.g., collections of dataset images) representing video data that was adaptively segmented by the adaptive segmentation engine 302. The predictive annotation engine 306 may be configured to associate respective annotation information with each of one or more frames of one or more frame sets. For example, the predictive annotation engine 306 may perform pre-labeling on the dataset images (e.g., the frame sets) generated from the adaptive segmentation. As part of the pre-labeling, in some example embodiments, one or more pre-trained ML models 308 may be loaded and employed to predictively annotate each dataset image.

In example embodiments, an ML model 308 used for pre-labeling may be pre-trained to detect a set of categories of objects. Example object categories include, without limitation, person, car, building, road sign, tree, etc. In example embodiments, the predictive annotation engine 306 may label each object detected by the ML model 308 in a frame image as well as associate various other predictive annotation information with the labeled object such as position, type, attributes, etc. The predictive label (pre-label) applied to a detected object may be, for example, a bounding box or other polygon that bounds the object in the dataset image. Predictive labeling of video dataset frames significantly reduces the time and cost burden of manual annotation because an annotator only needs to change/correct incorrect pre-labels. This burden is progressively lessened as the accuracy of the ML models 308 used to perform the predictive annotation improves.

The predictive annotation engine 306 may utilize an ML model 308 that is designed to detect pre-defined categories of objects. In other example embodiments, the predictive annotation engine 306 may utilize an ML model 308 that is specifically tailored for a particular detection scenario. For instance, an example ML model 308 may be specifically trained to do pre-labeling for human head detection in video captured of the interior of a school bus. For detecting common object categories, the predictive annotation engine 306 may utilize a more general-purpose commercially available or open-source ML model 308. In order to detect un-seen categories, a few-shot object detection algorithm and/or an incremental learning algorithm may be employed.

Referring now to other example components of the server annotation application 114, the collaborative annotation engine 310 may include machine-readable/machine-executable instructions stored in a storage media such as a memory that, when executed by one or more processing units, cause collaborative annotation operations to be performed. In some example embodiments, the collaborative annotation engine 310 may be configured to perform various operations related to managing collaborative annotation of video data by a group of manual annotators including video image frame distribution to annotators, annotation task progress tracking, notification of annotation deadlines, etc.

In example embodiments, a video dataset may contain hundreds or even thousands of hours of video recording, which may have been adaptively segmented into a collection of frame sets by the adaptive segmentation engine 302. Each frame set may contain a subset of the total frames of the dataset. The collaborative annotation engine 310 may be configured to assign one or more frame sets to each manual annotator. The frame set(s) may have been previously predictively annotated by the predictive annotation engine 306, and thus, may contain various pre-labels and predictive annotation information. The reduction in the number of frames to annotate (by virtue of the adaptive segmentation) and the pre-labeling of segmented frames may each serve to significantly reduce the amount of time required for a manual annotator to annotate the video frames.

In some example embodiments, the collection of frames included in a frame set may be bounded by an upper bound frame difference such that any frame in the frame set is within the upper bound frame difference from any other frame in the frame set. Under this approach, frame sets can be generated in such a manner to ensure a baseline level of similarity between all frames contained in the frame set. This, in turn, may increase the efficiency of manual annotation because the frame set may be assigned to a single annotator who may be able to leverage pre-labels and/or manually assigned labels from prior frames in the frame set to associate with subsequent frames via, for example, the annotation copy function 206 (FIG. 2).

In example embodiments, the collaborative annotation engine 310 may include an annotation metrics tracking engine 312 which may include machine-readable/machine-executable instructions stored in a storage media such as a memory that, when executed by one or more processing units, cause various annotation metrics to be tracked. An example annotation metric may be a task completion progress metric for an annotation project assigned to one or more annotators (e.g., an annotation project may include the respective one or more frame sets assigned to each annotator). In some example embodiments, the annotation metrics tracking engine 312 may be configured to track multiple task completion progress metrics such as an overall annotation project completion progress metric; a frame set-specific completion progress metric; an annotator-specific completion progress metric; or the like. In some example embodiments, the collaborative annotation engine 310 may provide a platform via which a group of annotators assigned portions of a same annotation project may collaborate, swap assigned frame sets, exchange information relating to newly defined object categories, or the like. The annotation metrics tracking engine 312 may be further configured to send annotation deadline notifications to annotators including, for example, various project-specific interim milestone deadlines (e.g., notification of a deadline for 50% completion of an annotation project in order to stay on track to meet final deadline).

In example embodiments, the collaborative annotation engine 310 may provide annotators with the capability to define new object categories, new object attribute information, or the like. With this capability, manual annotators can expand on the object labels and types of annotation information provided by any predictive annotation that may have been performed on the video data frames prior to manual annotation.

Figure 4A:
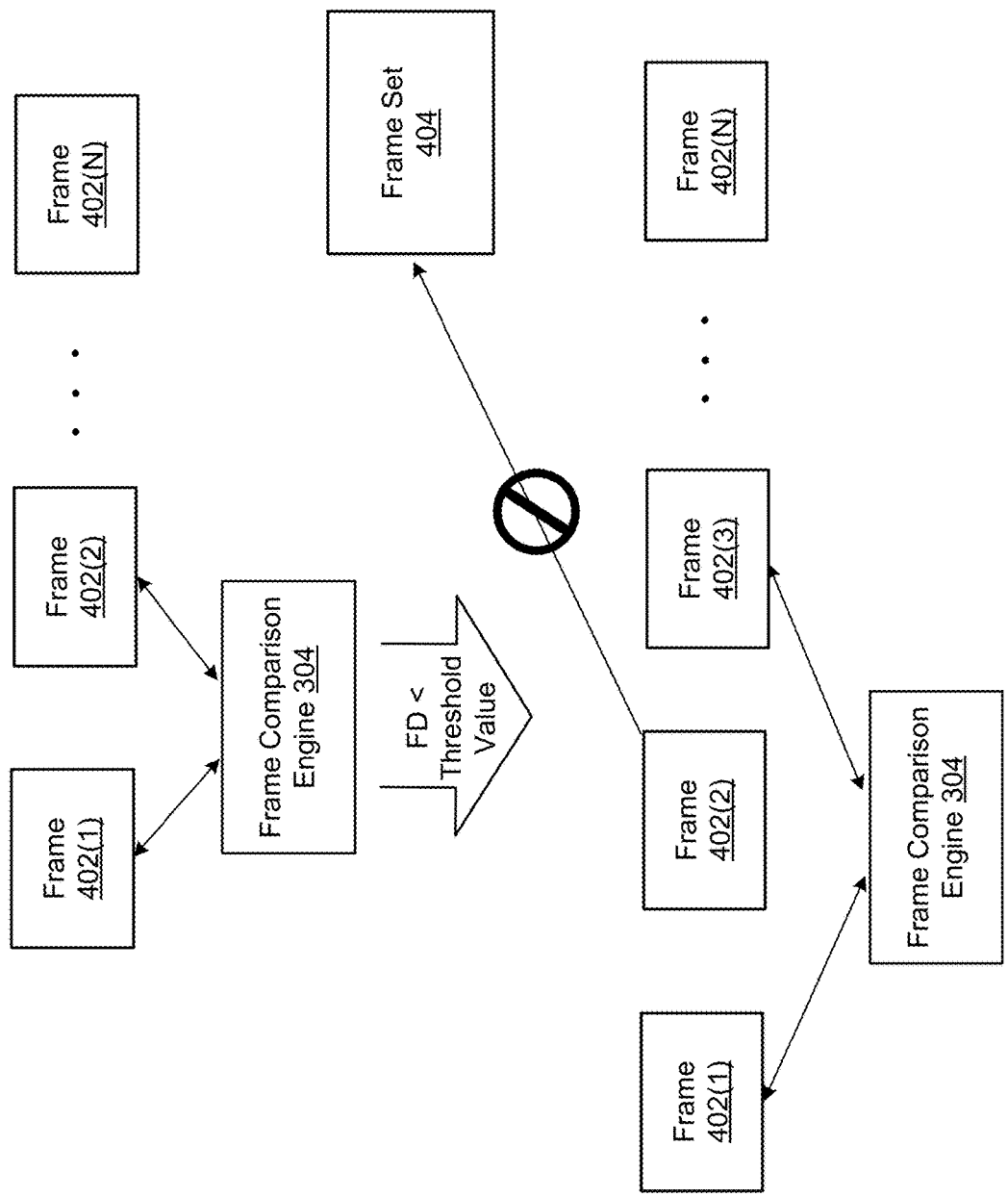
FIG. 4A depicts an example adaptive segmentation scenario involving the exclusion of a video data frame from a frame set to be annotated according to an example embodiment of the invention.
Figure 4B:
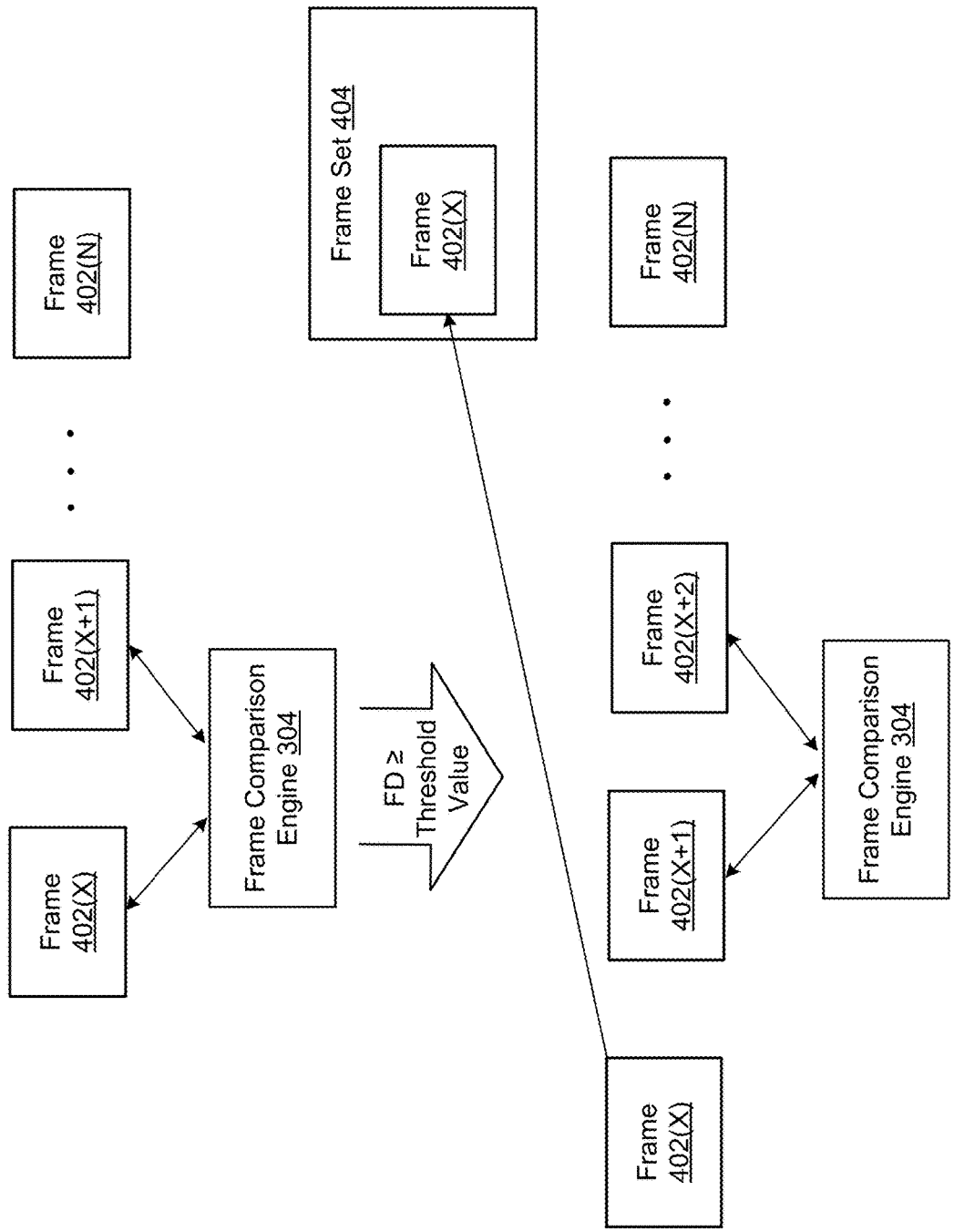
FIG. 4B depicts another example adaptive segmentation scenario involving the inclusion of a video data frame in a frame set to be annotated according to an example embodiment of the invention.
Figure 5:
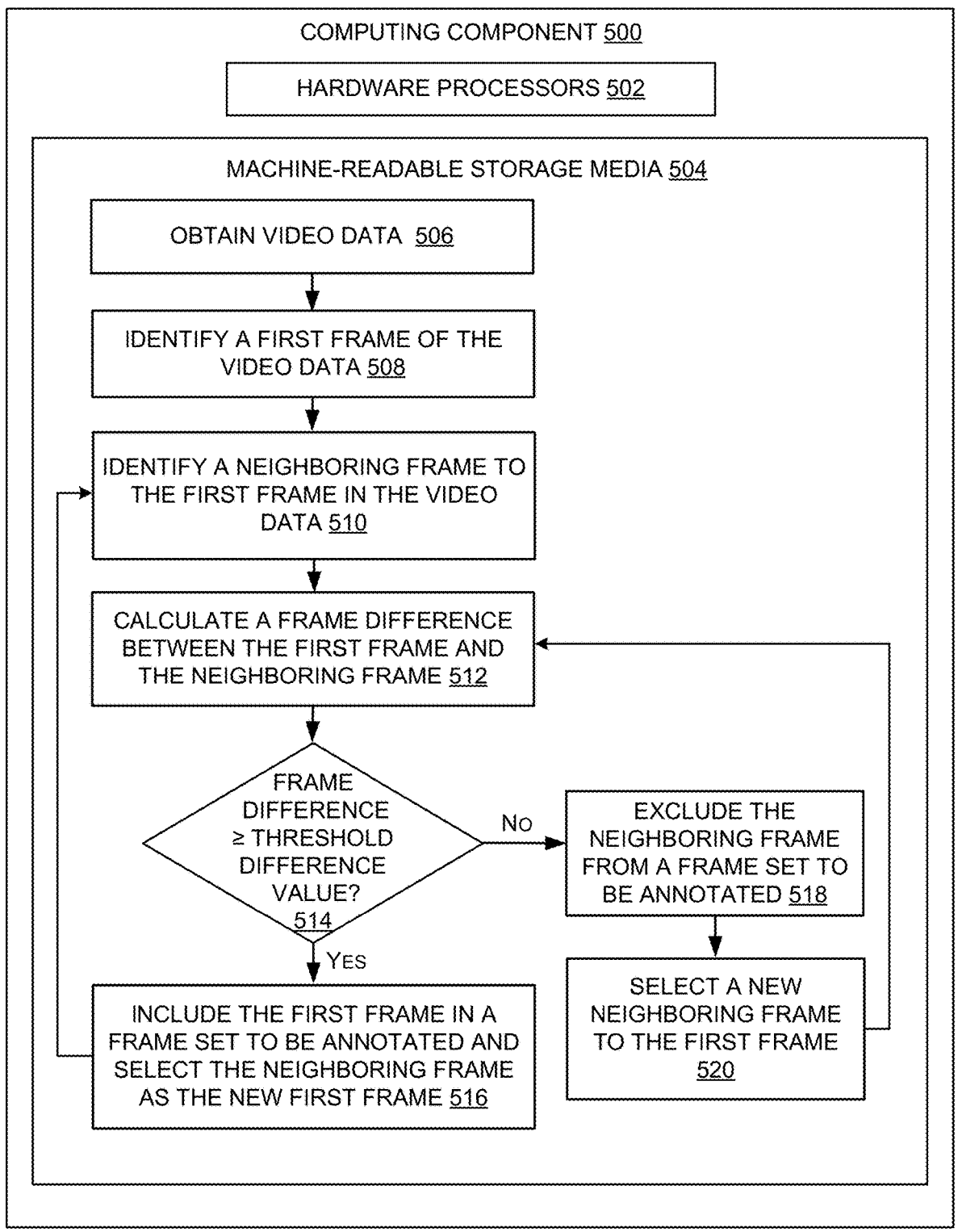
FIG. 5 depicts a set of executable instructions stored in machine-readable storage media that, when executed, cause one or more hardware processors to perform an adaptive segmentation method according to example embodiments of the invention.

FIG. 5 depicts a set of executable instructions stored in machine-readable storage media that, when executed, cause one or more hardware processors to perform an adaptive segmentation method according to example embodiments of the invention. FIGS. 4A and 4B depict various alternative adaptive segmentation scenarios involving the exclusion of a video data frame from a frame set to be annotated and inclusion of a video data frame in a frame set to be annotated, respectively. FIG. 5 will be described hereinafter in reference to FIGS. 3, 4A, and 4B.

FIG. 5 depicts a computing component 500 that includes one or more hardware processors 502 and machine-readable storage media 504 storing a set of machine-readable/machine-executable instructions that, when executed, cause the hardware processors 502 to perform an adaptive segmentation method according to example embodiments of the invention. The computing component 500 may be, for example, the computing system 800 depicted in FIG. 8 or another computing device described herein. The hardware processors 502 may include, for example, the processor(s) 804 depicted in FIG. 8 or any other processing unit described herein. The machine-readable storage media 504 may include the main memory 806, the read-only memory (ROM) 808, the storage 810, or any other suitable machine-readable storage media described herein.

In example embodiments, the machine-readable instructions represented by blocks 506-520 may form part of the adaptive segmentation engine 302 depicted in FIG. 3. At block 506, instructions of the adaptive segmentation engine 302 may be executed by the hardware processors 502 to cause video data to be obtained. In example embodiments, the processors 502 may obtain the video data from the datastore 116 (FIG. 1A). The video data may be raw, unprocessed video data such as raw video data files.

At block 508, instructions of the adaptive segmentation engine 302 may be executed by the hardware processors 502 to cause a first frame of the video data to be identified. Then, at block 510, instructions of the adaptive segmentation engine 302 may be executed by the hardware processors 502 to cause a neighboring frame to the first frame to be identified in the video data. In some example embodiments, the frames of a raw video data file may be sequentially arranged and associated with frame identifiers that identify the locations of frames within the sequence. In some example embodiments, neighboring video frames may be adjacent to one another in the frame sequence. In other example embodiments, neighboring video frames may have one or more intervening frames there between. For instance, as will be described in more detail later in this disclosure, after a first frame and a second frame (which may be adjacent frames) are compared, if the second frame is deemed similar enough to the first frame so as to warrant exclusion of the second frame from annotation, a pairwise combination may then be performed between the first frame and a third frame adjacent to the second frame. In this case, the first frame and third frame may be considered neighboring frames despite the presence of the intervening second frame because the second frame has already been considered for inclusion in and excluded from a frame set to be annotated.

At block 512, instructions of the frame comparison engine 304 may be executed by the hardware processors 502 to perform a pairwise frame comparison between the first frame and the neighboring frame. In example embodiments, performing the pairwise frame comparison may include determining a frame difference between the first frame and the neighboring frame. In example embodiments, determining the frame difference may include determining a respective difference between each pixel in the first frame and each corresponding pixel of the neighboring frame and aggregating the various pixel differences to obtain a frame difference—an aggregate measure of the extent of similarity/difference between the frames. For instance, in some example embodiments, the difference in pixel values at each pixel location between the first frame and the neighboring frame may be determined, squared, and summed. The square root of this result may then represent the frame difference. In other example embodiments, the absolute value of the difference in pixel values at each pixel location between the first frame and the neighboring frame may be determined and summed, and this value may represent the frame difference. Optionally, the sum of the respective absolute values may be normalized by some value (e.g., the number of pixels in the frames being compared).

In some example embodiments, each pixel may be associated with multiple pixel values, in which case, various techniques may be used to calculate the frame difference between frames. As a non-limiting example, assume that each pixel in the first frame and the neighboring frame to which it is being compared includes three color values corresponding to an RGB color scheme. The frame comparison engine 304 may determine respective differences between each R value, G value, and B value for each pixel of the first frame and each corresponding pixel of the neighboring frame. The frame comparison engine 304 may then calculate the sum of the absolute values of the differences or the sum of the squares of the differences of the various color values with respect to each pixel combination including a pixel in the first frame and a corresponding pixel in the neighboring frame. The frame comparison engine 304 may then take a root of or normalize the calculated sum in some manner in order to arrive at a respective pixel difference value for each pixel combination. These respective pixel difference values may be summed or aggregated in some fashion (including optionally weighting some pixel difference values over others) to arrive at a frame difference value.

In other example embodiments, continuing with the same non-limiting example introduced above, an average R value, an average G value, and an average B value may be determined for the first frame as well as for the neighboring frame. Respective differences between these average values for the two frames may be summed or otherwise aggregated in some fashion, and optionally, readjusted/normalized in some fashion (e.g., taking a root, dividing by the number of pixels, etc.) to arrive at a frame difference value. It should be appreciated that the above-described example approaches for determining the frame difference between two data frames are merely illustrative and not exhaustive.

Still referring to FIG. 5, at block 514, instructions of the frame comparison engine 304 may be executed by the hardware processors 502 to determine whether the frame difference calculated at block 512 meets a threshold difference value. Depending on the particular implementation, a first value meeting a second value may indicate that the first value is greater than or equal to the second value; the first value is strictly greater than the second value; the first value is less than or equal to the second value; or the first value is strictly less the second value. In the example implementation illustrated in FIG. 5, the frame comparison engine 304 checks, at block 514, whether the calculated frame difference is greater than or equal to the threshold difference value.

The threshold difference value may be a predetermined value indicative of a threshold at and/or beyond which two image/video frames are deemed to be sufficiently dissimilar to warrant using both frames in ground-truth training data, which may require, according to example embodiments of the invention, including one or more both frames in one or more frame sets to be annotated (e.g., labeled) to make the video data suitable as training data. In some example embodiments, the threshold difference value may be user-configurable based, for example, on a desired granularity/accuracy of an ML model to be trained based on ground-truth training data generated, at least in part, from the video data being adaptively segmented. In some example embodiments, the threshold difference value may be set based, for example, on a desired cost and/or time burden reduction sought from the adaptive segmentation.

Responsive to a negative determination at block 514, the neighboring frame may be excluded, at block 518, from a frame set to be annotated. That is, at block 518, instructions of the adaptive segmentation engine 302 may be executed to cause the hardware processors 502 to exclude the neighboring frame from annotation, thereby effectively excluding the neighboring frame from inclusion in an annotated ground-truth ML model training dataset. The neighboring frame may be excluded at block 518 because the calculated frame difference between the first frame and the neighboring frame is below the frame difference threshold, and thus, sufficiently similar to justify dropping the neighboring frame from annotation. Then, at block 520, instructions of the adaptive segmentation engine 302 may be executed to cause the hardware processors 502 to select a new neighboring frame for which to perform a pairwise frame comparison with the first frame. The new neighboring frame may be, for example, a successive frame adjacent to the second frame. From block 520, the pairwise frame comparison process may continue again from block 512, where a frame difference is calculated between the first frame and the newly selected new neighboring frame.

FIG. 4A illustrates a collection of frames 402(1)-402(N), where N is any positive integer greater than 1. The frames 402(1)-402(N) may form part of a raw video data file. As graphically illustrated in FIG. 4A, the frame comparison engine 304 calculates a frame difference value between, for example, a first frame 402(1) and a neighboring second frame 402(2) of the collection of frames 402(1)-402(N) (FIG. 5, block 512) and compares the calculated frame difference value to a threshold difference value to determine, for example, if the calculated frame value is greater than or equal to the threshold difference value (FIG. 5, block 514). As illustrated in FIG. 4A, assuming that the frame comparison engine 304 determines that the calculated frame difference between the first frame 402(1) and the second frame 402(2) is less than the threshold difference value, the second frame 402(2) may be excluded from inclusion in a frame set 404 containing frames to be annotated (thus excluded from annotation and inclusion in training data). The frame comparison engine 304 may then select a new neighboring frame (e.g., third frame 402(3)) and iteratively continue with a pairwise frame comparison of the first frame 402(1) and the third frame 402(3). As previously noted, a pairwise frame comparison as that term is used herein refers to operations for determining a frame difference value between two frames and comparing that frame difference to a threshold difference value.

Referring again to FIG. 5, if, on the other hand, the frame comparison engine 304 makes a positive determination at block 514 (i.e., a determination that the frame difference value between the first frame and the neighboring frame does meet the threshold value), which in turn, indicates that the neighboring frame is sufficiently dissimilar from the first frame, then at block 516, instructions of the adaptive segmentation engine 302 may be executed to cause the hardware processors 502 to include the first frame in a frame set to be annotated and select the neighboring frame as the new first frame for subsequent iterations of the pairwise frame comparison process. From block 516, the pairwise frame comparison process may continue again from block 510, where a new neighboring frame to the first frame may be identified (the previous neighboring frame being the new first frame).

FIG. 4B illustrates a subset 402(X)-402(N) of the collection of frames 402(1)-402(N) introduced in FIG. 4A. The frames 402(X)-402(N) may represent a snapshot of frames of a raw video data file remaining to be compared as part of the adaptive segmentation process described herein. As graphically illustrated in FIG. 4B, the frame comparison engine 304 calculates a frame difference value between, for example, a first frame 402(X) and a neighboring second frame 402(X+1) of the subset of frames 402(X)-402(N) (FIG. 5, block 512) and compares the calculated frame difference value to a threshold difference value to determine, for example, if the calculated frame value is greater than or equal to the threshold difference value (FIG. 5, block 514). As illustrated in FIG. 4B, assuming that the frame comparison engine 304 determines that the calculated frame difference between the first frame 402(X) and the second frame 402(X+1) meets the threshold difference value, the first frame 402(X) may be included in the frame set 404 containing frames to be annotated, and subsequent to predictive annotation followed up manual confirmation, included in ground-truth training data for training an ML video analytics model. The frame comparison engine 304 may then select the previous neighboring frame (i.e., second frame 402(X+1)) as the new first frame, select a next adjacent frame (e.g., frame 402(X+2)) as the new neighboring frame, and iteratively continue with a pairwise frame comparison of the new first frame 402(X+1) and the new neighboring frame 402(X+2).

Figure 6:
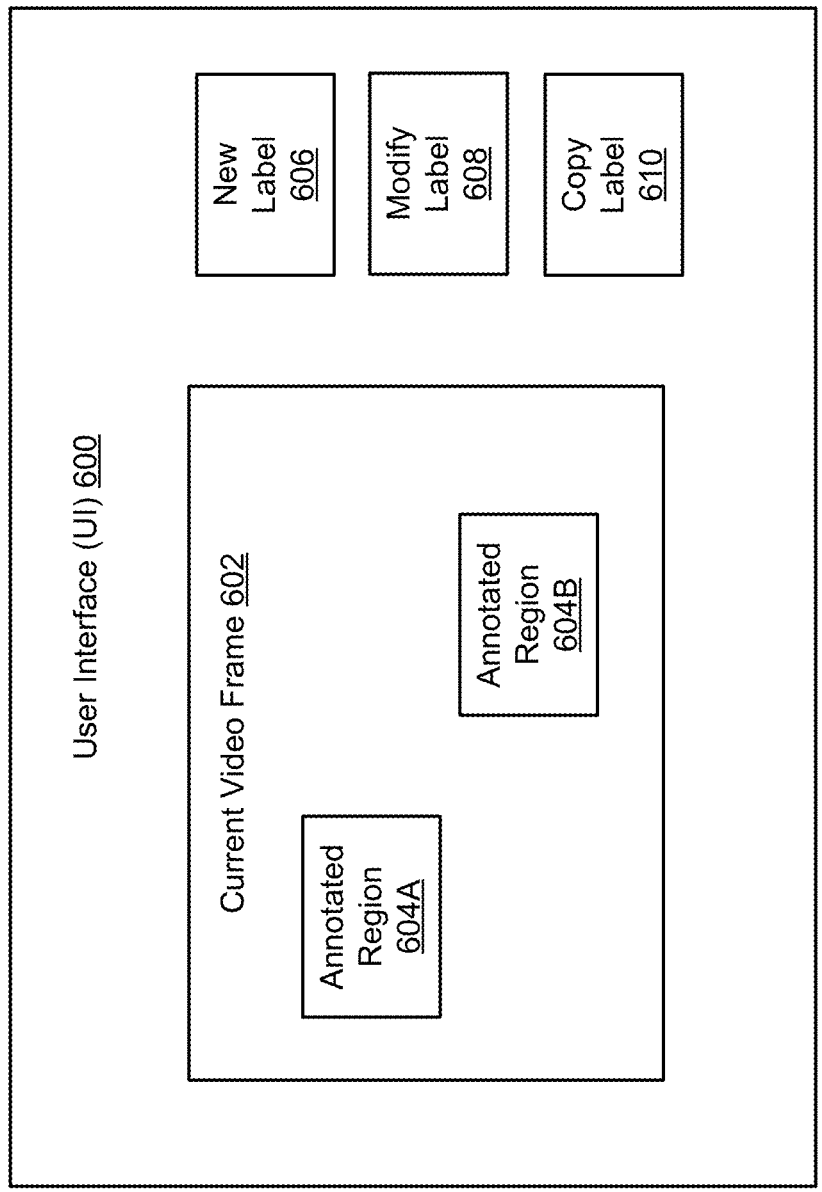
FIG. 6 depicts an example user interface (UI) configured to provide users with annotation tracking and other annotation-related functionality according to example embodiments of the invention.
Figure 7:
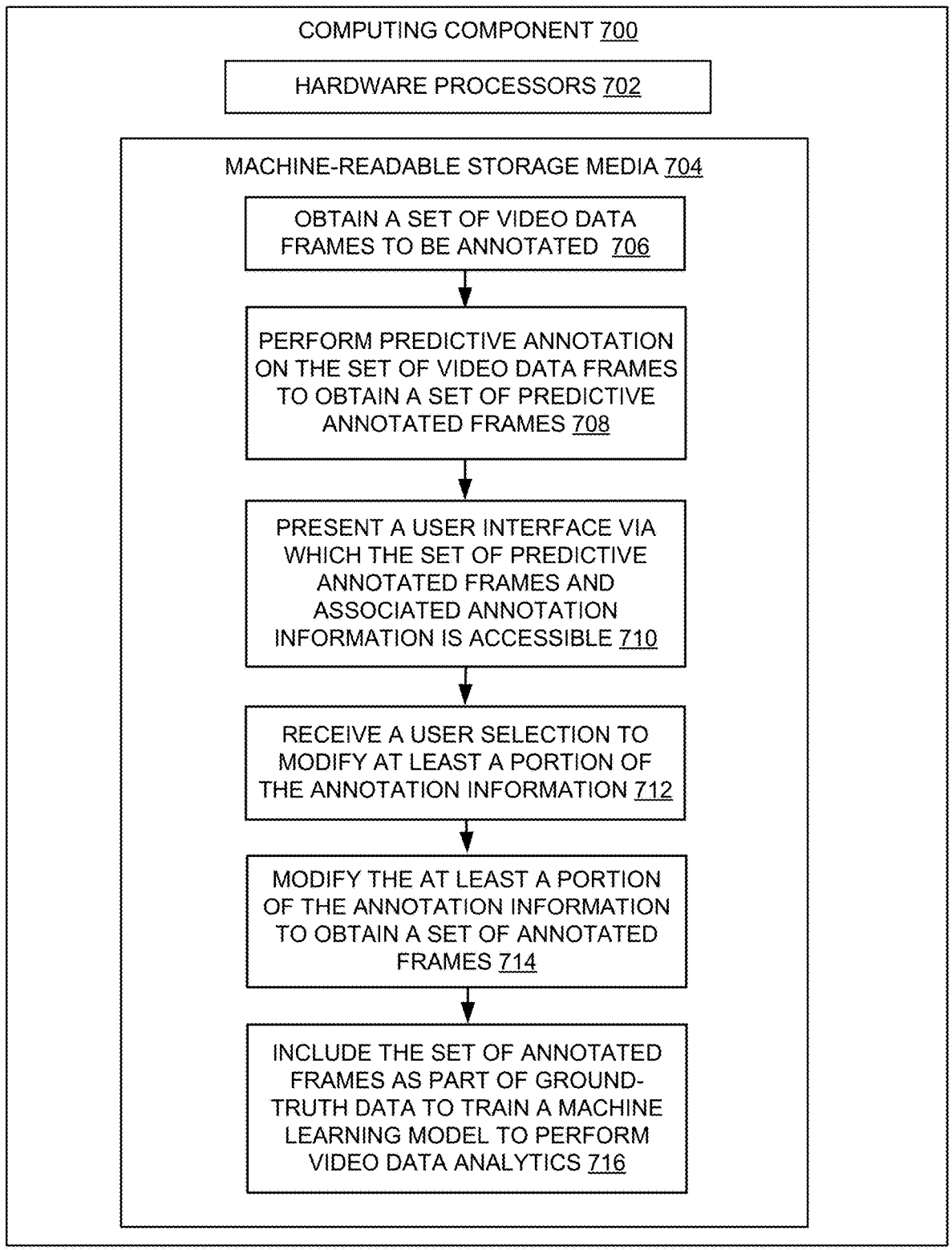
FIG. 7 depicts a set of executable instructions stored in machine-readable storage media that, when executed, cause one or more hardware processors to perform a method for predictive annotation of video data frames and for providing a UI via which annotation information associated with the predictive annotated frames can be modified by a user according to example embodiments of the invention.

FIG. 7 depicts a computing component 700 that includes machine-readable storage media 704 storing a set of executable instructions that, when executed, cause one or more hardware processors 702 of the computing component 700 to perform a method for predictive annotation of video data frames and for providing a UI via which annotation information associated with the predictive annotated frames can be modified by a user according to example embodiments of the invention. The computing component 700 may be, for example, the computing system 800 depicted in FIG. 8 or another other computing device described herein. The hardware processors 702 may include, for example, the processor(s) 804 depicted in FIG. 8 or any other processing unit described herein. The machine-readable storage media 704 may include the main memory 806, the read-only memory (ROM) 808, the storage 810, or any other suitable machine-readable storage media described herein. FIG. 7 will be described hereinafter in more detail in reference, at times, to each of FIGS. 3 and 6.

At block 706, instructions of the predictive annotation engine 306 (FIG. 3) may be executed to cause the hardware processors 702 to obtain a set of video data frames to be annotated. In some example embodiments, the frame set obtained at block 706 may correspond to an output of the adaptive segmentation process performed by the adaptive segmentation engine 302 and described in detail in reference to FIG. 5. In example embodiments, the predictive annotation engine 306 may obtain the adaptively segmented frame set to be annotated from the datastore 116 (FIG. 1).

At block 708, instructions of the predictive annotation engine 306 may be executed to cause the hardware processors 702 to perform predictive annotation on the set of video data frames to obtain a set of predictive annotated frames. The predictive annotation may include employing ML models pre-trained to automatically determine and associate respective annotation information with each of one or more frames of one or more frame sets. More specifically, the predictive annotation engine 306 may perform pre-labeling on the frame sets generated from the adaptive segmentation, and as part of the pre-labeling, may execute one or more pre-trained ML models 308 to predictively annotate each dataset image. In example embodiments, an ML model 308 used for pre-labeling may be pre-trained to detect a set of categories of objects. In some example embodiments, the ML model 308 may be pre-trained to detect a set of commonly observed object categories, while in other example embodiments, the ML model 308 may be narrowly tailored during pre-training to detect a set of object categories that are specifically related to a particular detection scenario.

At block 710, instructions of the collaborative annotation engine 310 may be executed by the hardware processors 702 to cause a UI to be presented, via which the predictive annotated frames and associated annotation information generated at block 708 can be accessed and manipulated. An example UI 600 is depicted in FIG. 6. As illustrated in FIG. 6, the UI 600 may provide an end user with the capability to review each predictive annotated frame including the associated annotation information and add, delete, or otherwise modify the predictive annotation information as necessary. The UI 600 is shown in FIG. 6 as currently displaying a particular video frame 602, which may be a predictive annotated frame that includes various predictive labels applied to detected objects and related annotation information.

For instance, the UI 600 may include a first annotated region 604A and a second annotated region 604B. The first annotated region 604A may include a pre-label assigned to a first detected object in the frame 602 and the second annotated region 604B may include a pre-label assigned to a second detected object in the frame 602. A pre-label may include, for example, a bounding box constructed around a detected object in an image frame, and optionally, associated predictive annotation information relating to the detected object such as object attributes, object category, etc.

The UI 600 may further include various user-selectable controls via which a user can select various functions to be performed with respect to the predictive annotation information. For instance, the UI 600 may include a new label control 606, a modify label control 608, and a copy label control 610. The new label control 606 may be selectable to cause a new object label to be defined and/or to cause an existing label to be associated with an object present in the frame 602. The modify label 608 control may be selectable to cause an existing label in the frame 602 (e.g., a pre-label) to be modified in some fashion (e.g., changing the object category, modifying a position of the polygon/bounding box in the frame 602, etc.). The copy label 610 may be selectable to initiate the annotation copy function 206 (FIG. 2) described earlier. That is, the copy label 610 may be selectable to copy at least a portion of the predictive annotation information associated with frame 602 to one or more other frames (e.g., copy one or more pre-labels to another frame).

Referring again to FIG. 7, at block 712, instructions may be executed by the hardware processors 702 to cause a user selection to be received via the UI (e.g., the UI 600), where the user selection is to modify at least a portion of the predictive annotation information. For instance, the user selection received at block 712 may be a user selection of the new label control 606, the modify label control 608, or the copy label 610 control, with respect to the annotated region 604A or the annotated region 604B.

Then, at block 714, instructions may be executed by the hardware processors 702 to cause at least a portion of the annotation information to be modified based on the user selection received at block 712. As an annotator manually reviews one or more frame sets of predictive annotated frames, and makes modifications to the predictive annotation information as necessary, a set of annotated frames may be obtained. At block 716, instructions may be executed by the hardware processors 702 to cause the set of annotated frames to be included as part of ground-truth data to train an ML model to perform various video data analytics.

Figure 8:
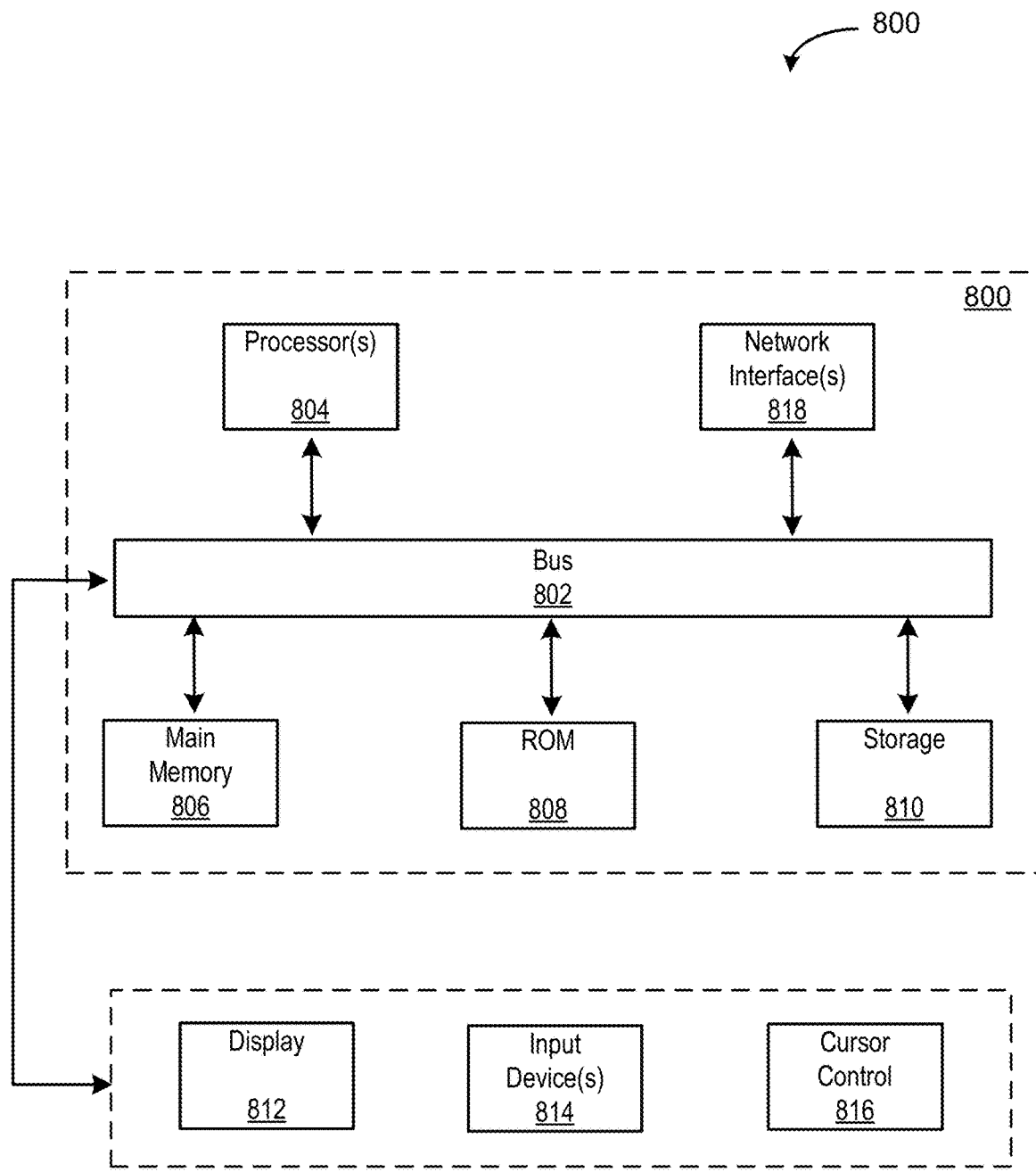
FIG. 8 is an example computing component that may be used to implement various features of example embodiments of the invention.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms such as machine-readable storage media, as used herein, refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Network interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An edge deployment video annotation system, comprising:
    an edge processor;
    a datastore communicatively coupled to the edge processor and configured to store video data; and
    a memory operatively connected to the edge processor, the memory including instructions that when executed cause the edge processor to:
        segment video data into a plurality of sets of frames to be annotated by:
            calculating a frame difference between a first frame of the video data and a neighboring second frame of the video data;
            determining, based at least in part on the calculated frame difference, that the second frame is to be excluded from the first set of frames at least in part by determining that the calculated frame difference does not meet a threshold value;
        responsive at least in part to the determination that the calculated frame difference does not meet the threshold value, effectuate an exclusion from annotation of the second frame by excluding the second frame from the first set of frames;
        perform predictive annotation on a first set of frames of the plurality of sets of frames to obtain a second set of predictive annotated frames; and
        provide an interface through which manual annotation of at least one predictive annotated frame is performed by modifying incorrect annotation information associated with the at least one predictive annotated frame.

2. The edge deployment video annotation system of claim 1, wherein the calculated frame difference is a calculated first frame difference, and wherein the memory includes additional instructions that when executed further cause the edge processor to:
    calculate a second frame difference between the first frame of the video data and a third frame of the video data;
    determine that the calculated second frame difference meets or exceeds a threshold value;
    output at least one of the first frame or the third frame as a dataset image to be included in the first set of frames based at least in part on the determination the calculated second frame difference meets or exceeds the threshold value.

3. The edge deployment video annotation system of claim 1, wherein the instructions when executed cause the edge processor to perform predictive annotation on the first set of frames at least in part by providing the first set of frames as input to a machine learning model that is pre-trained to detect a set of object classes.

4. The edge deployment video annotation system of claim 1, wherein the memory includes additional instructions that when executed further cause the edge processor to present, via the interface, an annotation tracking option to enable a user to copy annotation information associated with a third frame of the video data to a fourth frame of the video data.

5. The edge deployment video annotation system of claim 1, wherein the memory includes additional instructions that when executed further cause the edge processor to distribute the plurality of sets of frames of the video data to a plurality of users collaborating to annotate the video data.

6. The edge deployment video annotation system of claim 5, wherein the memory includes additional instructions that when executed further cause the edge processor to track progress among the plurality of users collaborating to annotate the video data.

7. The edge deployment video annotation system of claim 6, wherein the memory includes additional instructions that when executed further cause the edge processor to notify the plurality of users of an annotation deadline.

8. The edge deployment video annotation system of claim 1, wherein the at least one predictive annotated frame comprises a first predictive annotated frame, and wherein modifying the incorrect annotation information associated with the first predictive annotated frame comprises at least one of removing a predictive label associated with the first predictive annotated frame, manually associating a label with an unlabeled object present in the first predictive annotated frame, or modifying an object class associated with the predictive label.

9. A video annotation system, comprising:
an edge deployment, comprising:
  a frontend comprising a user terminal and a user interface;
  a backend comprising one or more edge servers communicatively coupled to the frontend; and
  a datastore communicatively coupled to the backend and configured to store video data, annotated video data, or a combination thereof,
wherein the backend of the edge deployment is configured to:
  segment the video data into a plurality of sets of frames to be annotated by:
    calculating a frame difference between a first frame of the video data and a neighboring second frame of the video data;
    determining, based at least in part on the calculated frame difference, that the second frame is to be excluded from the first set of frames at least in part by determining that the calculated frame difference does not meet a threshold value; and
  responsive at least in part to the determination that the calculated frame difference does not meet the threshold value, effectuate an exclusion from annotation of the second frame by excluding the second frame from the first set of frames; and
  perform predictive annotation on a first set of frames of the plurality of sets of frames to obtain a second set of predictive annotated frames.

10. The video annotation system of claim 9, the datastore further configured to store one or more video annotation algorithms, wherein the backend of the edge deployment is configured to employ the one or more video annotation algorithms to perform the predictive annotation.

11. The video annotation system of claim 9, wherein the frontend of the edge deployment is managed by a client and the backend of the edge deployment is managed by a service provider.

12. The video annotation system of claim 11, wherein an annotation service provided by the service provider is hosted on the edge deployment.

13. The video annotation system of claim 9, wherein the backend is configured to provide an annotator with access to the second set of predictive annotated frames through the user interface of the frontend.

14. A method comprising:
segmenting, by a processor, video data into a plurality of sets of frames to be annotated by:
  calculating, by the processor, a first frame difference between a first frame of the video data and a neighboring second frame of the video data;
  determining, by the processor based at least in part on the calculated frame difference, that the second frame is to be excluded from the first set of frames;
performing, by the processor, predictive annotation on a first set of frames of the plurality of sets of frames to obtain a second set of predictive annotated frames;
calculating, by the processor, a second frame difference between the first frame of the video data and a third frame of the video data;
determining, by the processor, that the calculated second frame difference meets or exceeds a threshold value;
providing an interface through which manual annotation of at least one predictive annotated frame is performed by modifying incorrect annotation information associated with the at least one predictive annotated frame; and
outputting at least one of the first frame or the third frame as a dataset image to be included in the first set of frames based at least in part on the determination that the calculated second frame difference meets or exceeds the threshold value.

15. The method of claim 14, further comprising performing, by the processor, predictive annotation on the first set of frames at least in part by providing the first set of frames as input to a machine learning model that is pre-trained to detect a set of object classes.

16. The method of claim 14, further comprising distributing, by the processor, the plurality of sets of frames of the video data to a plurality of users collaborating to annotate the video data.

17. The method of claim 16, further comprising tracking, by the processor, progress among the plurality of users collaborating to annotate the video data.

18. The method of claim 17, further comprising notifying the plurality of users of an annotation deadline.

* * * * *